United States Patent [19]

Lang

[11] 4,089,492

[45] May 16, 1978

[54] OCEAN ADAPTED AIRSHIP

[75] Inventor: Thomas G. Lang, San Diego, Calif.

[73] Assignee: The United States of America as represented by the Secretary of the Navy, Washington, D.C.

[21] Appl. No.: 763,271

[22] Filed: Jan. 27, 1977

[51] Int. Cl.² .......................... B64B 1/70; B64B 1/20
[52] U.S. Cl. ...................................... 244/30; 244/94; 244/97
[58] Field of Search ........................ 244/96, 97, 30, 94, 244/2, 50, 116; 114/272, 273, 280, 281; 290/53, 54, 43

[56] References Cited

U.S. PATENT DOCUMENTS

| 3,092,062 | 6/1963 | Savitsky | 114/280 X |
| 3,208,422 | 9/1965 | Schopmeyer | 114/281 |
| 3,619,632 | 11/1971 | Labombarde | 290/54 X |

FOREIGN PATENT DOCUMENTS

| 367,589 | 1/1923 | Germany | 244/94 |
| 587,317 | 4/1947 | United Kingdom | 114/272 |

Primary Examiner—Barry L. Kelmachter
Attorney, Agent, or Firm—Richard S. Sciascia; Ervin F. Johnston; Thomas Glenn Keough

[57] ABSTRACT

Two groups of tension lines depending from the forward and aft portions of an airship are each connected to a separate vertically oriented elongate strut. The struts are dimensioned to extend through and below surface waves of a body of water. Optionally, electric thruster/generator units are mounted in pods on the bottom of the struts to either propel the airship or act as generators while drifting. Laterally reaching hydrofoils extend from the pods and either work to reduce drag or ensure responsive operation. The combination of the tension lines, struts, thruster/generator units and hydrofoils permits precise maneuvering at the surface for off-loading and on-loading at sea, allows for long endurance and range and gives a capability for operating as a quiet platform.

8 Claims, 12 Drawing Figures

U.S. Patent May 16, 1978 Sheet 1 of 5 4,089,492
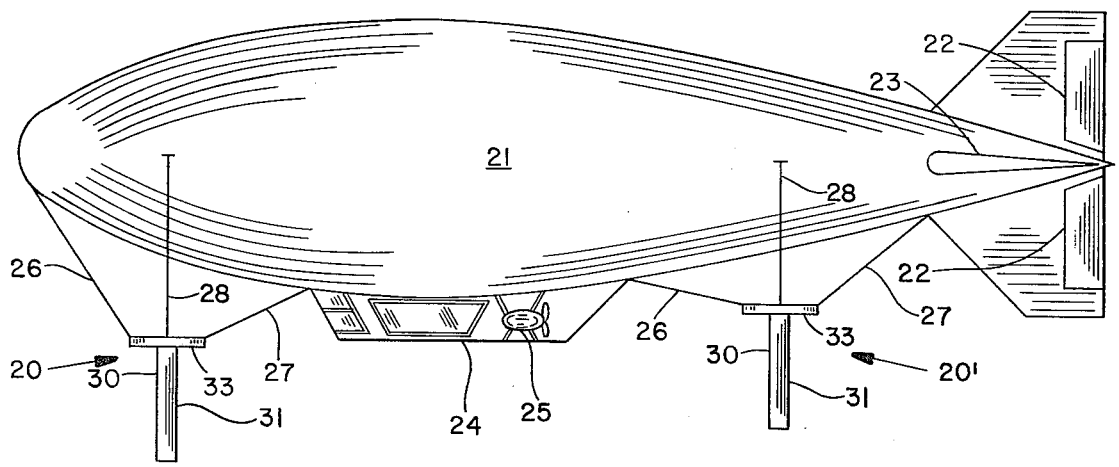
FIG. 1
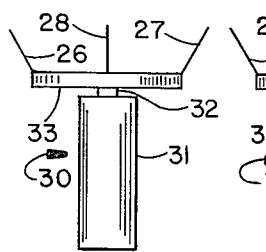
FIG. 2
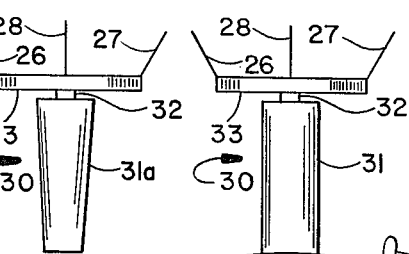
FIG. 3
FIG. 4
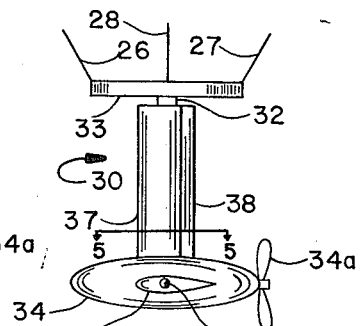
FIG. 5
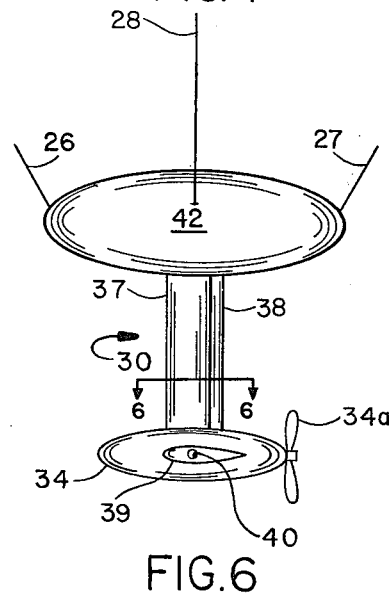
FIG. 6

OCEAN ADAPTED AIRSHIP

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

For some time airships and a family of related lighter-than-air-craft long have demonstrated their unique capabilities. Recently, interest has been renewed with a mind toward using them as extremely heavy load transporters. However, the heavy lift capacity airships as well as the related models all have several limitations. Among these are: large ground crews are needed; they have a limited maneuvering capability near the ground; they all have critical ballasting problems when taking on or removing cargo; and when controlled hovering over a body of water is called for in conditions of high wind or high sea states, they tend to become unmanageable due to cushioning effects and venturi reactions. These limitations, among others, restrict the airships' effectiveness and could be critical, particularly for military applications. Thus, there is a continuing need in the state-of-the-art for an improvement for airships which avoids or at least reduces the problems associated with operations over water in high wind conditions or high sea states.

SUMMARY OF THE INVENTION

The present invention is directed to providing an improvement for an airship operating over a body of water. Groups of tension lines depend from the airship and support elongate struts which pierce the surface of the water and extend through the level of surface waves to stabilize and to allow maneuvering of the airship near the water's surface. Optionally, pods containing electric thruster/generator units and also mounting hydrofoils are connected to the lower ends of the struts to further stabilize or aid in maneuvering the airship or to generate power.

An object of the invention is to provide an improvement for an airship.

Yet another object is to provide a means by which an airship has improved maneuvering capabilities close to the water's surface.

Still another object is to provide struts which extend through the level of surface waves to ensure increased stability when an airship is close to the water's surface.

Yet another object is to provide an improvement for an airship which locates thruster/generator units beneath the level of surface waves.

Still another object is to give an airship a capability to load or off-load cargo while at sea.

Another object is to give an airship a capability for generating power as it drifts over a body of water.

Another object is to provide an airship having the capability for loading or off-loading in high sea states and high wind conditions.

A further object is to provide a device for stabilizing an airship in high velocity winds when over a body of water.

Another object is to provide a device for varying its ballast to ensure stability for the airship.

These and other objects of the invention will become more readily apparent when taken with the ensuing description in view of the drawings.

BRIEF DESCRIPTION OF THE DRAWINGS

FIG. 1 shows a side view of the invention in transit on an airship.
FIG. 2 is one embodiment of the invention.
FIG. 3 is another embodiment of the invention.
FIG. 4 is yet another embodiment of the invention.
FIG. 5 is still another embodiment of the invention.
FIG. 6 is still another embodiment of the invention.
FIG. 12 is a rear view of the invention in the sailing and/or power generating mode.

DESCRIPTION OF THE PREFERRED EMBODIMENTS

Figure 7:
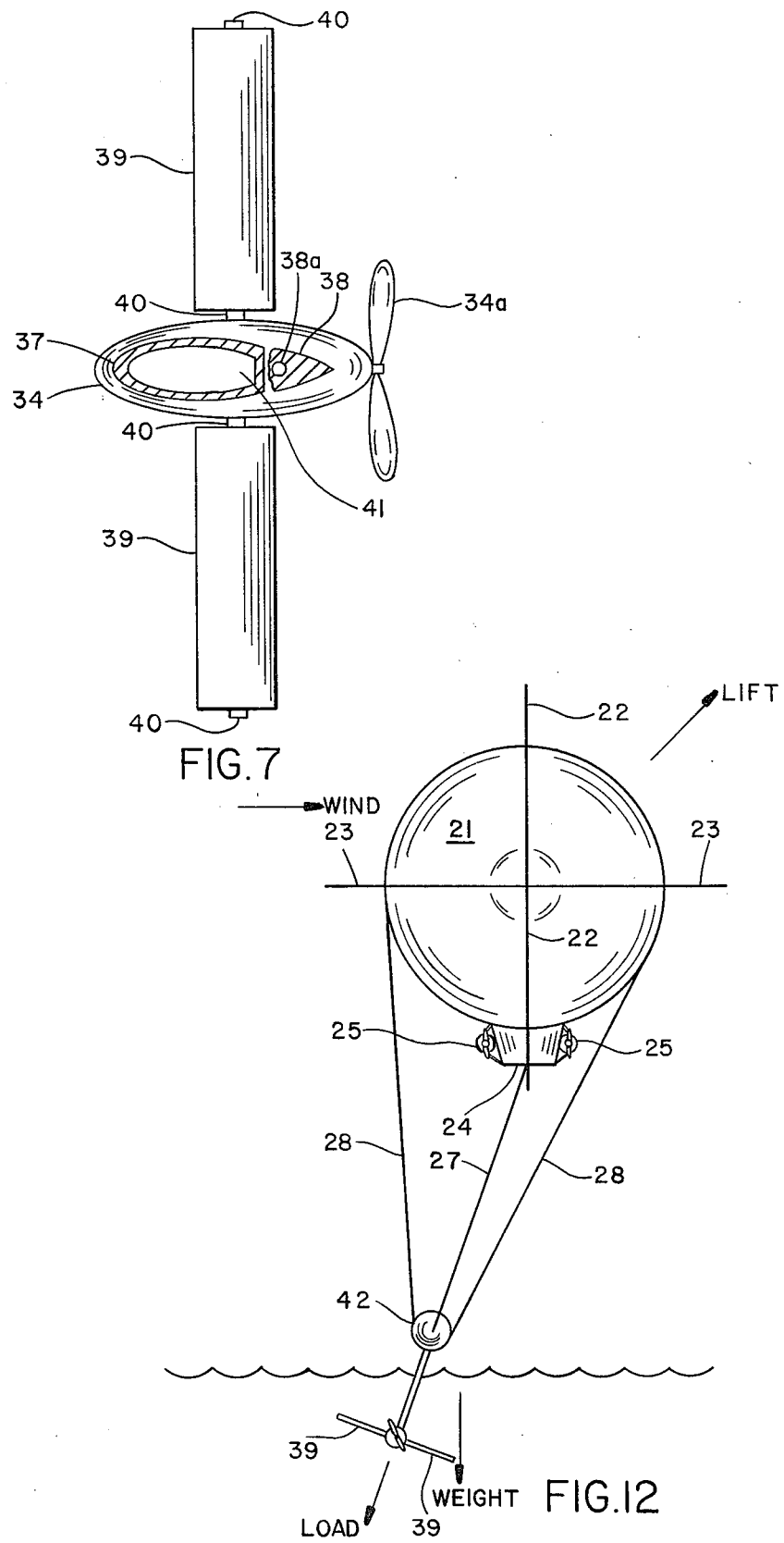
FIG. 7 is a cross-sectional view taken generally along lines 5—5 and 6—6 in FIGS. 5 and 6.

Referring now to the drawings and more specifically to FIG. 1, a pair of ocean adapters 20 and 20' are suspended from an airship 21 of conventional design. Airships normally travel at moderate speeds and are provided with a pair of rudders 22 and a pair of elevators 23 which usually steer the craft in attitude and heading from hydraulic pressures and electric signals coming from a control or command nacelle 24. Larger airships have several motor driven propulsers, but the representative design has two juxtaposed motor driven propellers 25 carried on opposite sides of the command nacelle or mounted on the frame of the airship. Irrespective of the configuration of the lighter-than-air-crafts, all can benefit from the concept of this invention which gives a control capability to overcome some of their obvious shortcomings. The ocean adapters 20 and 20' can help airships become more useful for over water operations.

All the embodiments of the ocean adapters partially remedy poor handling characteristics of an airship when it hovers or is maneuvering close to the surface of a body of water. The ocean adapters provide stability and better maneuvering particularly where high winds and high sea states complicate control.

The details of one embodiment of the ocean adapter, as shown in FIG. 1 while the airship is in transit, is better seen in FIG. 2. The adapter includes a forward line 26, an aft line 27, a pair of lateral lines 28 along with other structure elaborated on below. Early development of airships taught the pioneers that stability of suspended loads was better assured by a combination of longitudinal lines and lateral lines as opposed to a rigid structure. The fore, aft, and lateral lines forming a part of the ocean adapters are a product of these hard learned lessons. The ability to vary the lengths of these lines along with structure to be described contribute to the effectiveness of this inventive concept.

The lines are reeled on winches, not shown, either on the surface or inside the airship envelope. When in transit, the cables are reeled in to reduce the problems associated with air-drag and strumming after transit, the cables are played out a sufficient length to allow a portion of strut assemblies 30 to penetrate the surface of the ocean.

As noted in FIG. 2, one of the principal parts of each embodiment of this strut assembly is an elongate strut 31 having a vertical length several times the length of its chord. Preferably the strut has a streamline lateral cross-sectional configuration. However, a variety of shapes could be employed with varying degrees of effectiveness. In any case, the length of the strut is sufficient to penetrate the expected surface waves.

The strut works somewhat similarly to a spar buoy. But the streamline configuration of any strut herein disclosed allows its being relatively, easily pulled through the water by the motors on the airship to aid steering and add stability.

When the forward and aft struts are suspended to extend through the surface waves, the airship becomes more stabilized. Now a dip sonar could be lowered and self generated flow noise would be significantly reduced because of the stability of the platform on the surface.

The airship's maneuverability is greatly increased by mounting each elongate strut on a shaft 32 which is connected to an elongate rotation unit 33. The rotation unit is provided with a small electric or hydraulic actuation unit for rotating strut 31 about the axis of shaft 32. Now, when the struts are immersed and motors 25 are turning, the airship is capable of changing its heading by the hydrodynamic coaction of the struts alone or in concert with aerodynamic control rudders 22. This degree of control permits the performance of a variety of tasks that could not otherwise be performed by an airship.

A variation of the design of FIG. 2 is shown in FIG. 3. The elongate strut 31a is tapered along its vertical length while still retaining a hydrodynamic cross-sectional configuration. This modification like the preceeding is rotatable by a rotation unit 33 to give the airship increased maneuverability when operating near the ocean's surface.

It should be pointed out that the rotation unit is sufficiently dimensioned to further stabilize the airship. Joining the forward line 26 and the aft line 27 at spaced opposite longitudinal, extremes a considerable distance apart, helps avoid the creation of pitching moments by each strut assembly 30. In like manner, coupling both lateral lines 28 at lateral extremes of each rotation unit 33 reduces the creation of rolling moments by the strut assemblies.

An increased capability is realized by the embodiment of the ocean adapter depicted in FIG. 4. This embodiment includes the elements described with respect to FIG. 2 and additionally adds a pod 34 housing a thruster/generator unit mounting a propeller 34a. After elongate strut 31 has been lowered through the surface waves, the thruster/generator in the pod can be actuated from control nacelle 24. The propeller rotates and the airship is pulled through the water. Rotation of shaft 32 steers the airship to a different heading. When operating in this mode, the crew in the command nacelle have the option of either leaving motors 25 running or solely relying on the pods 34 for locomotion.

Another mode of operation calls for using the thruster/generators in each pod for generating electric power for a bank of storage batteries or for powering on-board equipment. This mode of operation will be elaborated on later, leave it suffice to say that the embodiment of FIG. 4 has a dual thruster/generator capability.

The embodiment of FIG. 5 is yet another embodiment of the ocean adapter inventive concept. This embodiment also has the forward, aft, and lateral lines 26, 27, and 28 of FIG. 2. However, the rotation unit 33 is fixed and functions as a platform member secured to an elongate strut 37 which is fixed to its pod 34. Also noting FIG. 7, an articulable flap 38 is journaled in the platform member and has a shaft 38a coupled to suitable rotation imparting machinery to rotate the flap. Thus, the flap is responsively articulated upon the receipt of suitable signals from the control nacelle and the airship is steered.

This version of the ocean adapter provides for even greater stability by the inclusion of a pair of laterally extending hydrofoils 39 mounted on shafts 40 extending from each pod 34. The hydrofoil generally is employed to orient the ocean adapter at a predetermined attitude and depth. As it is responsively actuated from the command nacelle, much greater stability is assured as will be elaborated on below.

Another variation of the inventive concept is depicted in FIG. 6. All the structural elements discussed regarding the preceeding embodiment are included with the addition of a ballast tank 42 mounted on the uppermost end of the strut. Suitably connected pumps and interconnecting sections of piping are provided to effect the flooding and evacuation of the tank. This tank is used to compensate for variations in weight and to ensure that its strut and pod are immersed the proper length.

Noting FIG. 7, a cross-sectional representation of the struts of FIGS. 5 and 6 shows a further modification of the struts. A ballasting chamber 41 is formed in each hollowed out strut 37. Pumps responsive to signals from the command nacelle flood or evacuate the chambers to provide additional weight or buoyancy. The chambers can also be included in the other struts discussed above. When ballasting chambers are included in the design shown in FIG. 6, they augment the buoyancy tank's capacity.

FIGS. 8 through 12 portray the ocean adapters reaching through surface waves to stabilize an airship while giving a maneuvering capability. Such stability and maneuvering otherwise is difficult when an airship is close to the ground and these complications are magnified over water during the high sea states and wind conditions.

Figure 8:
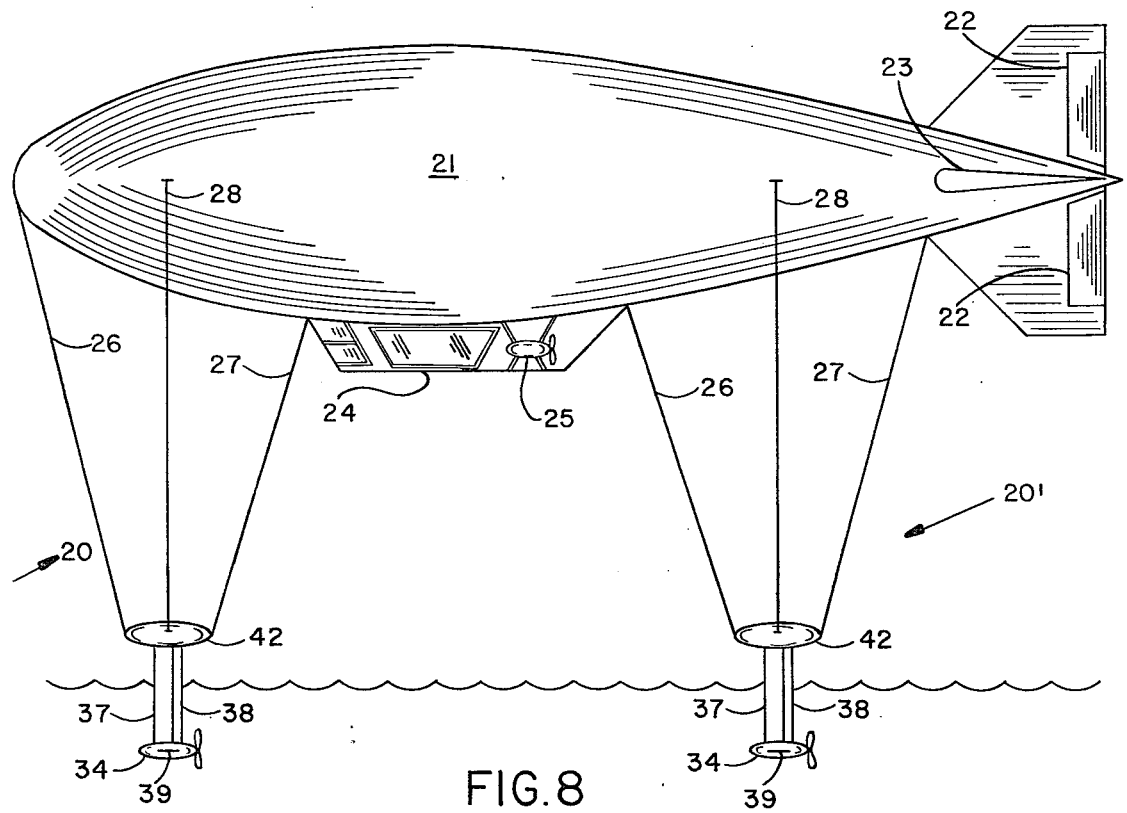
FIG. 8 depicts the invention operationally deployed from an airship.

FIG. 8 shows ocean adapters 20 and 21 deployed to place a strut assembly through the water-air interface. For purposes of demonstration only, the embodiment of the strut assembly shown in FIG. 6 is used, it being understood that any of the embodiments of the assembly of FIGS. 2 through 5 could also serve to stabilize and aid in the maneuvering capability of the airship.

Forward, aft, and lateral lines of each ocean adapter are unreeled from their respective winches and when the strut assemblies reach through the layer of surface waves, the airship is positioned a given distance above the surface of the water. Motors in the pods 34 are actuated to propel the airship and the hydrofoils 39 are articulated to hold struts 37 and flaps 38 at a desired level of immersion. Turning the airship is easily accomplished by articulating flaps 38. The flaps can be used alone or in conjunction with the rudders 22 of the airship to effect steerage. Similarly, motors 25 on the airship can be shut off or left running to augment the thrust produced by the motors in pods 34.

The ocean adapters 20 and 20' make the airship a stable platform for a dip sonar. Motors in pods 34 are shut off and the sonar is lowered from the airship. Flaps 38 are appropriately actuated so that the thrust provided by motors 25 directs the airship along a desired course. There is little, if any, motor noise to interfere with the operation of the sonar so that the ability for detection and tracking is markedly increased.

Figure 9:
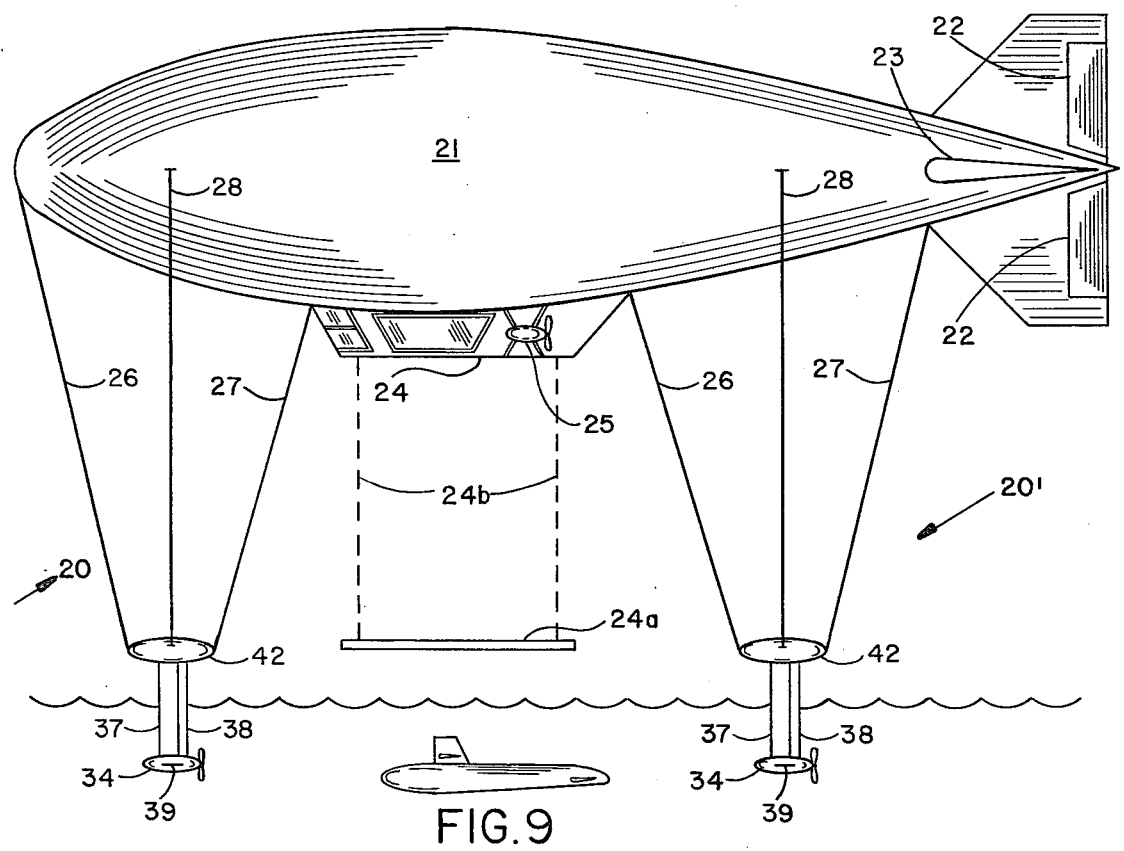
FIG. 9 shows the invention off-loading or on-loading in a relatively high sea state.

Another capability afforded by ocean adapters 20 and 20' is to enable the deployment or supply of surface and subsurface craft, a subsurface craft being shown in FIG. 9. Heretofore, the massive cargo ferrying capabilities of huge airships could not be used in such a manner since precise hovering and buoyancy compensation were difficult. Add to this the fact that there have always been control problems near the ocean surface, especially in rough weather. With the ocean adapters, deployed as disclosed, the airship is stabilized and can precisely maneuver to deploy or retrieve craft as well as transferring supplies or personnel.

Figure 10:
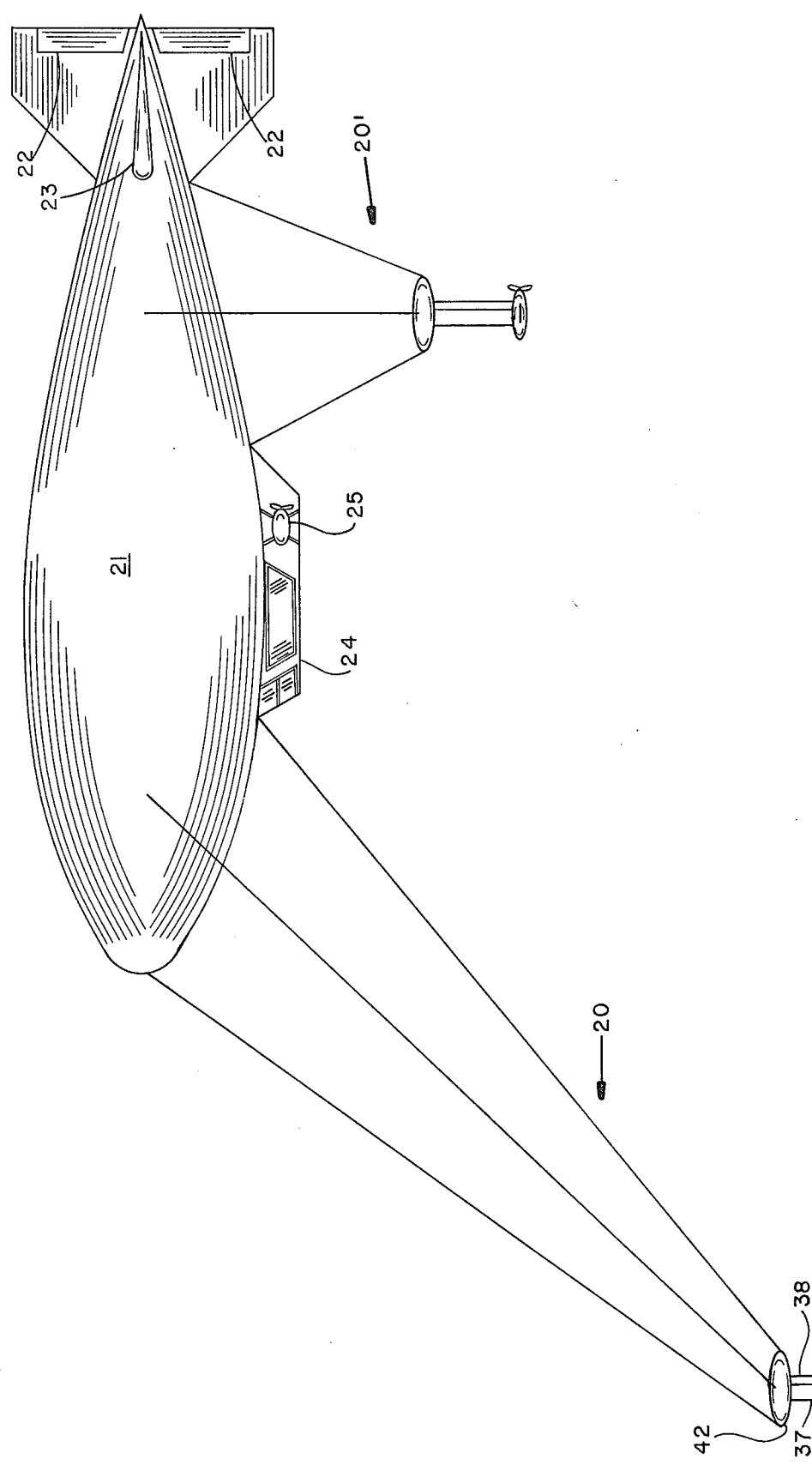
FIG. 10 shows the invention pulling an airship close to the water's surface.

Looking to FIG. 10, an ocean adapter 20 is shown pulling the airship while adapter 20' is suspended above the water's surface. In this mode of operation the airship can be tethered in high wind conditions or can be pulled by an ocean adapter while riding close to the water's surface, thereby presenting a lower silhouette. The rudders 22 and elevators 23 are brought into play to help lower the airship.

Figure 11:
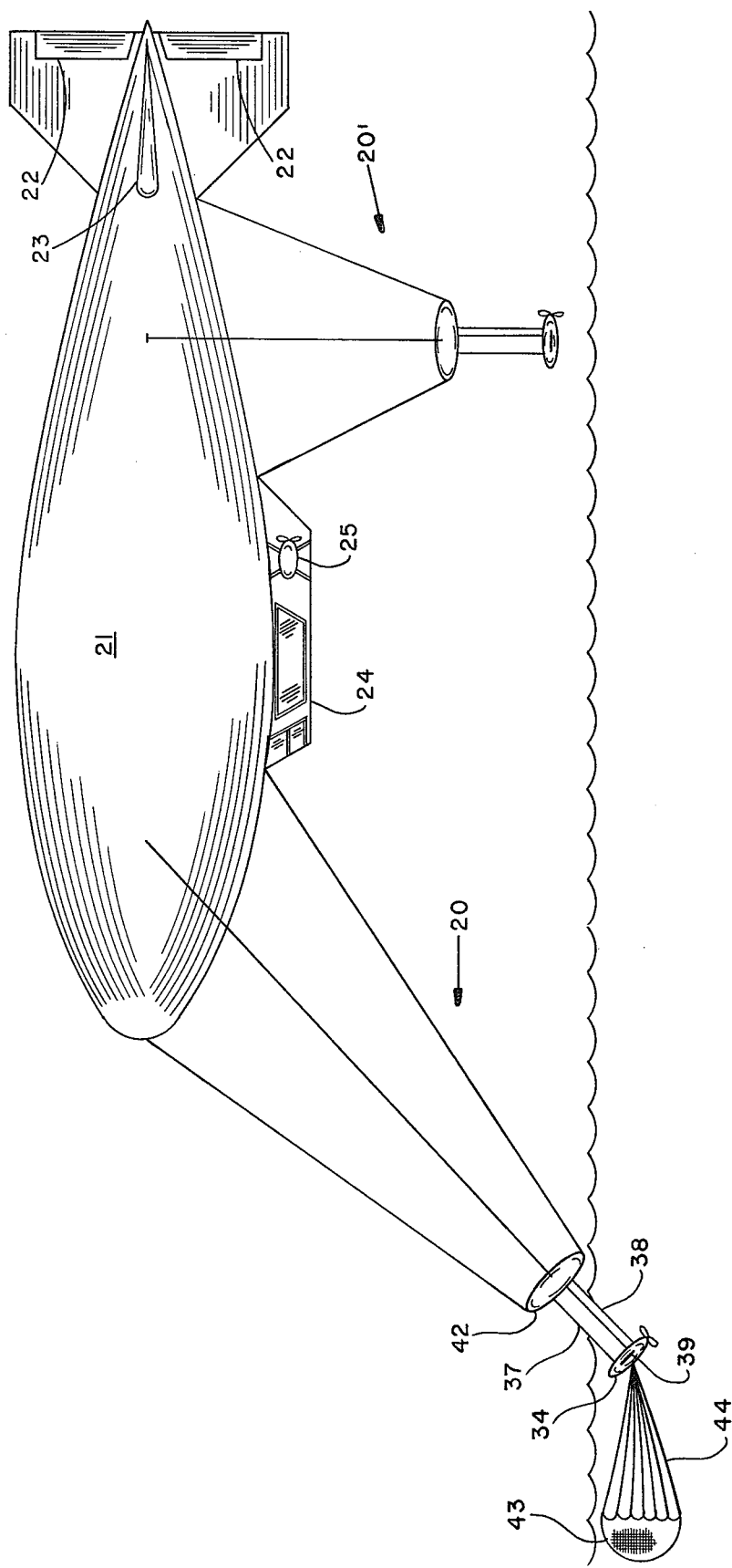
FIG. 11 depicts the invention mooring an airship in high wind conditions.

FIG. 11 shows an ocean adapter 20 functioning as a pylon in a severe wind condition. Hydrofoil 39 is appropriately actuated to hold the ocean adapter beneath the surface of the water. A drogue chute 43 has its risers 44 connected to pod 34 to aid the adapter's holding the airship from drifting in the gale. The rudders and elevators of the airship are used to prevent airship's being slammed into the water.

FIG. 12 schematically depicts an unique application of the ocean adapter. The motor/generator in the pod 34 is switched to operate as a generator. The motors 25 on the command nacelle are turned off and the airship drifts in the wind. Playing out more of the right lateral line 28 than the left lateral line 28 allows strut assembly to trail the drifting airship. The extended hydrofoils 39 act as drags can be articulated to function as a rudder. As the pod 34 is pulled through the water, the water rushing by propeller 34a turns the propeller and the interconnected thruster/generator generates electrical power. Power thusly developed is fed to the command nacelle and stored or used as needed. If the command nacelle has a bank of storage batteries, they can be charged in this manner and, if the motors 25 are electric, they can be driven at a later time.

Obviously, many modifications and variations of the present invention are possible in the light of the above teachings, and, it is therefore understood that within the scope of the disclosed inventive concept, the invention may be practiced otherwise than as specifically described.

What is claimed is:

1. In an airship for operating over a body of water an improvement therefor is provided comprising:
   means depending from the airship for providing tensile support only, the tensile support means includes a set of lines depending from the forward portion of the airship and a second set of lines depending from the aft portion of the airship;
   means coupled to the tensile support providing means having a sufficient length for extending from above the surface of the body of water to below the surface waves, the extending means having a vertical length in excess of its chord and a streamlined lateral cross-sectional configuration to stabilize the airship as the airship is situated above the water's surface, wherein said extending means comprises a pair of extending means, one of said extending means connected to the first set of lines and the other of said extending means connected to said second set of lines, both extending means are elongate hydrodynamically shaped struts;
   an electric generator thruster unit mounted on the lower end of each extending means;
   an articulable hydrofoil mounted on each electric generator thruster unit for orienting said unit in a predetermined attitude; and
   means mounted on the upper end of each extending means above the water's surface for ballasting the airship and for adjusting the height above water to permit improved control of the airship near the surface of the body of water.

2. An improvement for an airship according to claim 1 in which the elongate hydrodynamically shaped struts are tapered.

3. An improvement for an airship according to claim 1 in which the ballasting means comprise a seawater ballast tank.

4. An improvement for an airship according to claim 3 further including:
   means coupled to at least one electric thruster generator unit for providing a drag thereon.

5. An improvement for an airship according to claim 4 in which the drag providing means comprises a drogue chute.

6. In an airship for operating over a body of water an improvement therefor is provided comprising:
   means depending from the airship for providing tensile support only;
   a pair of struts provided with movable control surfaces for changing and maintaining the heading of the airship, each strut having an elongate chamber extending at least a portion of its length for optionally containing ballasting water and each of the struts is coupled to the tensile support providing means and has a sufficient length for extending from above the surface of the body of water to below the surface waves, each of the struts has a vertical length in excess of its chord and a streamlined lateral cross-sectional configuration to stabilize the airship as the airship is situated above the water's surface;
   an articulated hydrofoil carried on the lower end of each of the pair of struts and extending laterally outwardly therefrom for controlling the immersion depth of the pair of struts; and
   means mounted on the upper end of the pair of struts above the water's surface for ballasting the airship and for adjusting the height above water to permit improved control of the airship near the surface of a body of water.

7. An improvement according to claim 6 in which the tensile support providing means has an adjustable length.

8. An improvement according to claim 7 in which one of the struts depends from the forward part of the airship and the other of the struts from the aft part of the airship.

* * * * *